3,847,878
PROCESS FOR PREPARATION OF POLYAMIDE-IMIDES AND SHAPED ARTICLES OF SAME
Robert B. Hanson, Kendall, and James R. Stephens, Naperville, Ill., assignors to Standard Oil Company, Chicago, Ill.
No Drawing. Filed Apr. 9, 1973, Ser. No. 348,868
Int. Cl. C08g 20/32
U.S. Cl. 260—78 TF                    12 Claims

ABSTRACT OF THE DISCLOSURE

Polyamide-imides are prepared by reacting trimellitic anhydride with an aromatic or an aliphatic diamine in the molar ratio of about 1:0.55 to 1:0.95 and then reacting this product with at least 0.45 to about 0.75 moles to about 0.05 to about 0.35 moles of an aromatic diisocyanate. The products are useful as wire enamels and coatings when they are formulated into wire enamels and coated on electrical conductors. They may also be used as molding resins.

This invention relates to high molecular weight polymers derived from trimellitic anhydride, aromatic and aliphatic diamines, and diisocyanates. The products are useful for wire enamel in the protection of electrically conductive metallic wire such as copper.

The new polymers are also useful for the formation of a variety of heat-resistant insulating films, coatings and molded articles.

It has been discovered that polyamide-imide polymers result from the reaction of trimellitic anhydride with diamines and diisocyanates which exhibit surprisingly good wire enamel properties.

The prepolymers of this invention may be described as low molecular weight species which by design are not formed in high molecular weight since they are produced by reaction imbalance leaving an excess of carboxylic acid groups which are produced advantageously by the reaction of an excess of trimellitic anhydride to the aromatic or aliphatic primary diamines and which upon further reaction with diisocyanates produce high molecular weight polyamide-imides.

Such polyamide-imide prepolymers are polymeric polymer acid compounds having in their molecules units of

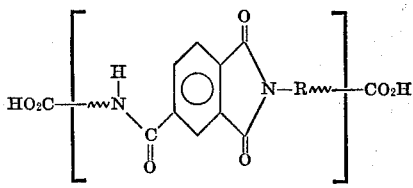

wherein R is a divalent aromatic or aliphatic organic radical. This organic radical consists of R' which is a divalent aromatic or aliphatic hydrocarbon radical or two R' divalent aromatic or aliphatic hydrocarbon radicals joined by stable linkages

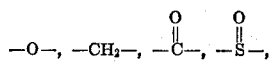

as are in the groups

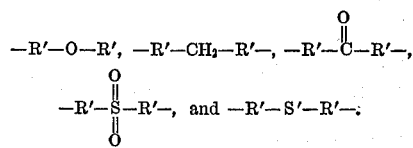

These prepolymer products are reacted with diisocyanates to produce high molecular weight polyamide-imides having to a substantial extent recurring units of

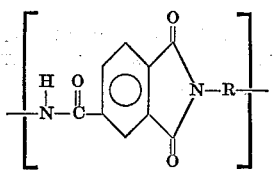

wherein R is a divalent aromatic or aliphatic organic radical in which in addition to hydrogen, nitrogen, sulfur and oxygen atoms can be attached to the carbon atoms. This organic radical consists of R', which is a divalent aromatic or aliphatic hydrocarbon or two R' divalent aromatic or aliphatic hydrocarbon radicals jointed by stable linkages

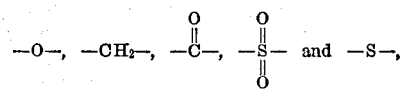

as are in groups —R'—O—R', —R'—CH$_2$—R'—,

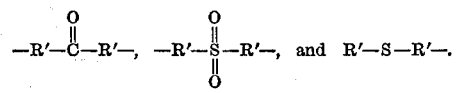

It has now been found that wire enamels and polymers can be obtained by reacting trimellitic anhydride with aromatic or aliphatic diamines in the molar ratio of 1:0.55 to about 1:095 and then reacting this product with about 0.45 to about 0.75 moles to about 0.05 to about 0.35 moles of an aromatic diisocyanate. Suitably, the molar ratio can be 1 mole trimellitic anhydride, about 0.7 to about 0.8 moles aromatic or aliphatic diamine and at least about 0.2 to about 0.3 moles of an aromatic or aliphatic diisocyanate.

In the above reaction, the trimellitic anhydride and the diamine react to form a polyamide-imide prepolymer. This low molecular weight species having carboxylic acid end groups is reacted with the diisocyanate. In the preferred embodiment 1 mole of trimellitic anhydride is reacted with 0.8 mole of diamine. This polymer is then reacted with at least 0.2 moles of the diisocyanate.

The reaction between the trimellitic anhydride and the diamine is carried out at a temperature of about 210° to about 250° C., preferably at about 220°-230° C. when atmospheric pressure is used. To this product is added the diisocyanate at a temperature ranging between room temperature and 125° C. Suitably, the reaction temperature may be 120° to 155° C. and preferably this final reaction is initiated at room temperature and completed at about 135° C.

The polyamide-imide prepolymer forming reaction is normally carried out in the same solvent used to form the wire enamel. Nitrogen or sulfoxide containing organic polar solvents or substituted phenols are advantageously employed. Useful solvents include the following: N- methylpyrrolidone, cresylic acid, p-cresol, m-cresol, dimethyl sulfoxide, N-methyl caprolactam, and phenol. The preferred solvent is N-methylpyrrolidone.

At the completion of the prepolymer forming step, diluents may be added. Representative diluents include N-methylpyrrolidone, dimethylacetamide (DMAC), dimethylformamide, or mixtures of the above with aromatic hydrocarbon streams (such as Solveso 100 and 150), xylenes and toluenes.

The diamines useful for the reaction may be aromatic or aliphatic. These diamines have the formula

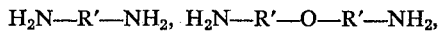

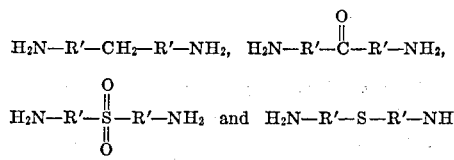

wherein R' is a divalent aromatic or aliphatic hydrocarbon radical. The aromatic diamines have from one to about four aromatic rings, advantageously from one to about two aromatic rings. The aromatic diamines having more than one aromatic ring may be further characterized as polycyclic aromatic compounds having two primary amino groups on an interconnected polycyclic aromatic nucleus. The aromatic rings may be interconnected by condensation, as in naphthalene or in phenanthrene-type structures, or may be bridged, either directly as in benzidine or indirectly as, for example, two R' groups are joined with stable inert linkages such as oxy, alkenyl, carbonyl, sulfonyl and other relatively inactive groups such as sulfide groups as hereinbefore described. Suitable nuclei (R' divalent aromatic hydrocarbon radical) include phenyl, naphthyl, anthryl, naphthacenyl and the like; diphenyl, terphenyl, phenylnaphthyl, quaterphenyl and the like; and aromatic rings separated by oxy, sulfonyl and thio groups, and aliphatic groups containing from 1–12 carbon atoms. The aliphatic diamines, including alkylene diamines such as hexamethylene diamine, ethylene diamine, pentamethylene diamine and dodecamethylene diamine, are useful.

Useful aromatic diamines include methylene bis(aniline), (4,4'-diaminodiphenylmethane), oxy bis(aniline), (4,4'-diaminodiphenylether), benzidine), m-phenylenediamine, p-phenylenediamine, 2,4- and 2,6-toluenediamine (and mixtures of such), 3,3'-diaminodiphenyl, 1,4-diaminonaphthalene, 4,4'-diaminodiphenyl ketone, 4,4'-diaminodiphenyl sulfone, bis(4-aminophenyl)-1, 1-ethylene.

Useful aromatic diisocyanates include methylene bis (4-phenylisocyanate), oxy bis(4-phenylisocyanate), 1,5-naphthalene diisocyanate, m-phenylene diisocyanate, mesitylene diisocyanate, durylene diisocyanate, toluene diisocyanate, 4,4'-bis-o-tolylene diisocyanate, 4,4'-methylchloro-1,3-phenylene diisocyanate, 3,3'-dimethyl-4,4-diisocyanatodiphenyl methane, 3,3'-bitolylene - 4,4' - diisocyanate, 4,4'-diisocyanato diphenyl sulfone. Useful alkylene diisocyanates include hexamethylene diisocyanate, ethylene diisocyanate, dodecamethylene diisocyanate, and pentamethylene diisocyanate.

The polyamide-imides are employed as wire enamels while in solution in a solvent system such as those specified above. It is applied to an electrical conductor, e.g., copper, silver, aluminum or stainless steel wire in conventional fashion, e.g., by the "free dip" method or the "die application" procedure, both of which procedures are described in Meyer, U.S. Pat. 3,201,276. Wire speeds of 15–40 feet per minute can be usd with wire tower temperatures of 400° to 900° F., usually with a final temperature above 500° F. The build-up of the polyamide-imide enamel on the wire can be 0.0013 to 0.0049 inch, preferably 0.0026 to 0.0034 inch using No. 18 wire. The wire is passed through the enamel one or more times until the desired build-up is obtained. By build-up is meant the total increase in diameter over the bare wire diameter.

As noted above, the soluble polyamide-imides can be converted to tough, infusible and insoluble resins. Advantageously, this is accomplished in the process of forming films, coatings, fibers, impregnated and molded articles. For example, a solution of the product, that is the polyamide-imide, is applied to a wire, or other surface, and heated at a temperature of about 200° to about 420° C., usually about 300°–400° C. (for wire coatings), for a time sufficient to evaporate solvents and form the insoluble polyamide-imide. At 400° C., about one minute is usually sufficient, whileat 300° C., about two minutes are required.

In this manner, surfaces, sheets, etc., made out of metal like steel, copper, aluminum, nickel, etc., for example, or various alloys, can be coated. Similarly, laminated objects having a plurality of layers bonded together with the polyamide-imide on the material to be laminated which has been connected to the polyamide-imide. The lamination is carried out by placing the object to be laminated to the polyamide-imide of this invention dissolved in an organic solvent and then curing each layer at elevated temperatures. As one layer of the polyamide-imide is cured, the objects can again be placed in the polymer solution and the process continued. Glass or asbestos fibers can be coated by depositing the polyamide-imide in solution on said materials and then heat curing it.

The polyamide-imides of this invention generally have inherent viscosities of at least 0.3 dl./g. (in DMAC, at 25° C.). The properties of the polyamide-imide, when cast as a film, show that it has a tensile strength at 25° C. of between 13,500 and 15,000 p.s.i. and an elongation at 25° C. from 10 to 25% in addition to having excellent electrical properties and thermal stability.

The following examples illustrate some embodiments of this invention. It will be understood that they are for illustrative purposes only and do not purport to be wholly definitive as to conditions or scope.

EXAMPLE I

In a suitable vessel equipped with a nitrogen purge, stirrer, condenser with trap is placed 1059.0 parts trimellitic anhydride, 717.0 parts N-methylpyrrolidone and 68.0 parts pseudocumene. The mixture is brought to 100°–110° C. and 874.0 parts of methylenebis(aniline) are added over a 5–10 minute period. The temperature is then raised to 225° C. over a 3 hour period. The aqueous layer is continually withdrawn from the trap. The solution is held at 225° C. for 5 hours, heat is removed, 4851.0 parts of N-methylpyrrolidone is added over 30–45 minutes, and the solution allowed to cool. At 48° C. 286.0 parts of Isonate 125 mf. are added and the mixture stirred for 30 minutes. The solution is brought to 100° C. and held for one hour, then raised to 135° C. and held for one hour. An additional 71.0 parts of 125 mf. is added over a 2 hour period until the Gardner-Holdt viscosity is Z6–7. At 25° C. the Brookfield viscosity was 238 poise at 32.5% solids.

(a) To 1000 parts of the above solution was added 333.3 parts xylene yielding a solution at 23.5% of 32 poise. The solution was coated on 18 gauge copper wire. The test data for this are given in the Table following. Run A is sole coat and Run B is top coat. The test descriptions are given in the paragraphs headed "Coated Wire Tests."

(b) To 54.9 parts of the solution prepared in Example I were added 18.3 parts xylene, 9.0 parts TiO$_2$, 3.0 parts nickel titanate yellow and 14.8 parts N-methylpyrrolidone. All materials were mixed in a ball mill overnight. A sample of the mixture was spread on a Bonderite 37 steel panel and cured at 500° F. for 15 minutes.

COPPER WIRE COATING DATA

| Run | Tower speed, f.p.m. | Temp. °F. Cure | Temp. °F. Bottom | Scrape, gm. | 20% jerk plus s.p.m. | Snap plus s.p.m. | Burnout, secs. | Dielectric strength k.v.p.m. |
|---|---|---|---|---|---|---|---|---|
| A | 35 | 900 | 550 | 1,410 | 2X | 4X | 1,083 | 2.9 |
|   | 40 | 900 | 550 | 1,430 | 2X | 2X | 1,147 | 3.1 |
| B | 45 | 850 | 500 | 1,320 | 1X | 1X | 612 | 3.5 |
|   | 55 | 850 | 500 | 1,330 | 1X | 1X | 649 | 2.9 |

NOTE.—For Run A—6 passes for sole coat are used; For Run B—4 passes polyester undercoat Isonel 200, which is polyester modified by tris hydroxyethylisocyanurate (manufactured by Schenectady Chemical Co.) plus 2 passes of the overcoat of the same amide-imide used in Run A.

Tests:

| | |
|---|---|
| Cured film thickness [mils] | 1.0 |
| Pencil Hardness | 5H+ |
| Sward Hardness | 27 |
| Cross-Hatch Adhesion, percent | 100 |
| ⅛″ Conical Mandrel Bend, percent pass | 100 |
| Direct Impact [in.-lbs.] | >160 |
| Reverse Impact [in.-lbs.] | >160 |

1. R-900, DuPont Chem. Co.
2. #14, Shepard Chem. Co.

(c) To 10 parts of the solution prepared in Example I were added 3.3 parts N-methylpyrrolidone and the solution wet-spun into distilled water. The film was cured for 5 minutes at 600° F. and gave a strand which was flexible and could be knotted.

(d) Adhesive application.

Small samples of the product prepared in Example I were spread on Cold Rolled Steel (Bonderite® 1000 treatment) and cured under vacuum at 80° C. for 16 hrs. (for T-Peel adhesion), and likewise coated on 0.064″ Hot Rolled Steel (chloroethene cleaned) and cured (as above) for Lap Shear tests.

T-Peel Adhesion—17.9 p.s.i.
Lap Shear—1600 p.s.i.
The test specimens were prepared using a 15 sec. activation at 20 p.s.i. at 660° F. on a Sentinel heat sealer.

EXAMPLE II

Into a suitable vessel equipped with a nitrogen purge, stirrer, condenser with trap is placed 384.2 parts trimellitic anhydride, 183.8 parts m-phenylenediamine, 260.0 parts N-methylpyrrolidone and 36.6 parts pseudocumene. The mixture was brought to 220° C. over a 3 hour period and held at the temperature for 5 hours. The aqueous layer was continually withdrawn from the trap. After the 5 hour-20° C. period, 2000.0 parts dimethylacetamide was added over a 15 minute period and the solution allowed to cool. At 25° C. 65.0 parts m-phenylene diisocyanate was added and the mixture stirred for 30 minutes. The temperature is raised to 135° C. over 1.5 hours. After 45 minutes at this temperature 15.0 parts of m-phenylene diisocyanate are added and heating is continued for 30 minutes. At 25° C. the Brookfield viscosity was 62 poise at 24.3% solids. The product had an inherent viscosity of 0.38 dl./g. (DMAC, at 25° C.).

(a) 500 parts of the above solution was precipitated into 1500 parts distilled water in a Waring Blender. The product was filtered, washed, dryed, and molded. The mold used as 8½″ diameter and 1¾″ thick. It had a molding cavity 5½″ in diameter. The mold was charged with 78 parts polymer and heated to 620° F. The sample was pressed according to the following schedule:

| Time min. | Pressure tons |
|---|---|
| 40 (contact pressure) | 0 |
| 2 | 2.5 |
| 2 | 5 |
| 1 | 10 |
| 4 | 25 |
| 1 | 50 |
| 5 | 25 |

The mold was cooled to 540° F. and the disc ejected.
Tensile Strength—11,121 p.s.i.
Elongation—4.0%.

EXAMPLE III

Into a suitable vessel equipped as in Examples I and II is placed 192.1 parts trimellitic anhydride, 100.0 parts hexamethylene diamine, 130.0 parts N-methylpyrrolidone and 36.6 parts pseudocumene. The mixture is brought to 225° C. over a 3 hour period and held at this temperature for 5 hours. The aqueous layer is continually withdrawn from the trap. Heat is removed and 800 parts N-methylpyrrolidone are added over a 20 minute period. The solution was allowed to cool. At 25° C. 40 parts Multrathane M were added and the mixture stirred for 30 minutes. The temperature was raised to 135° C. After 1 hour 18.0 parts of Multrathane M were added and heating was continued for 30 minutes. The product has a Brookfield viscosity (at 25° C.) of 149 poise at a solids content of 26.9%. A tough, flexible film could be prepared by casting a portion of the solution on glass and curing at 600° F. for 3–5 minutes.

Coated Wire Tests

The wire enamel in the example was coated on a G.E. 15 foot two zone, vertical, forced air enameling oven. Six coating passes were used to apply the proper insulation thickness. The wire (copper) thickness was 18 AWG. The coated magnet wire was tested according to ASTM D-1676 for film thickness, film flexibility and adherence and unidirectional scrape resistance. Short term thermal stability or burnout as determined according to the overload test procedure given in NEMA MW 1000 (Part 3, Sec. 3–2.6).

The flexibility and adhesion were tested according to ASTM D-1676. To be amenable to automatic winding and normal abuse the wire should take a full snap. This means it should be capable of being drawn rapidly to break and have the stretched portions of the coating on the wire remain integral, i.e., it should have no cracks (brittleness) and it should not "tube" or separate from the substrate (poor adhesion). In addition to passing this snap adhesion test, it is desirable that the stretched portion of a wire which has been stretched either 20% of its original length (20% jerk) or to the breaking point (full snap) be capable of being wound about a mandrel as small as possible. The mandrels used are 1,2,3, etc. Hence, a rating terminology for magnet wire flexural properties is full snap—or 20% jerk + SPM (smallest passing mandrel). Normally the 20% jerk test is considered more realistic in regard to commercial usage with a value of IX being considered the top rating. A 20% jerk-SPM of 2 is considered very good, 3 is acceptable, 4 is a marginal pass-fail and 5 is failure.

We claim:

1. A process for preparing high molecular weight polyamide-imide polymers having film-forming properties which process comprises first condensing trimellitic anhydride and a primary diamine in a mole ratio of about 1 to 0.55 to about 1 to 0.95 at a temperature of about 210° C. to about 250° C. to give a low molecular weight prepolymer having the carboxylic acid anhydride groups reacted with the diamine and a portion of the carboxylic acid groups reacted with the diamine leaving the remaining carboxylic acid groups unreacted [an excess of trimellitic anhydride moieties] and second further condensing this prepolymer with about 0.45 to about 0.75 moles to about 0.05 to about 0.35 moles of a diisocyanate for each mole of trimellitic anhydride in an inert solvent at a temperature of about 25° C. to about 150° C.

2. The process of Claim 1 wherein the molar ratio of the trimellitic anhydride to diamine is about 1 to 0.7 to about 1 to 0.8 and the mole ratio of the trimellitic anhydride to the diisocyanate is 1:0.3 to 1:0.2.

3. The process of Claim 1 wherein the condensation of the trimellitic anhydride with the diamine is carried out at a temperature of about 220° C. to about 230° C. and the further condensation is carried out at about 130° C. to about 140° C.

4. An electrical conductor having a continuous coating of the polyamide-imide prepared according to the process of Claim 1.

5. A film of the polyamide-imide prepared according to the process of Claim 1.

6. A process according to Claim 1 wherein the aromatic diamine is methylene dianiline.

7. A process according to Claim 1 wherein the aromatic diisocyanate is methylenedi-p-phenyldiisocyanate.

8. A fiber prepared from the polyamide-imide prepared according to the process of Claim 1.

9. An adhesive of the polyamide-imide prepared according to the process of Claim 1.

10. A laminate having a plurality of layers bonded together with the polyamide-imide prepared according to the process of Claim 1.

11. A molded article prepared from the polyamide-imide of Claim 1.

12. In combination with an article coated with a protective material, wherein the improvement comprises the coating material which is a high molecular weight polyamide-imide polymer prepared by a process comprising first condensing trimellitic anhydride and a primary diamine in a mole ratio of about 1 to 0.55 to about 1 to 0.95 at a temperature of about 210° C. to about 250° C. to give a low molecular weight prepolymer leaving the carboxylic acid anhydride groups reacted with the diamine and a portion of the carboxylic acid groups reacted with the diamine having the remaining carboxylic acid groups unreacted and second, further condensing this prepolymer with about 0.45 to about 0.75 moles to about 0.05 to about 0.35 moles of a diisocyanate for each mole of trimellitic anhydride in an inert solvent at a temperature of about 25° C. to about 150° C.

References Cited
UNITED STATES PATENTS

| | | | |
|---|---|---|---|
| 3,518,230 | 6/1970 | Sheffer et al. | 260—65 |
| 3,562,189 | 2/1971 | Farrissey, Jr. et al. | 260—2.5 |
| 3,716,519 | 2/1973 | Yoda et al. | 260—47 CB |
| 3,260,691 | 7/1966 | Lavin et al. | 260—30.2 |

LESTER L. LEE, Primary Examiner

U.S. Cl. X.R.

117—161 P, 232; 161—227; 260—47 CB, 77.5 R

PO-1050
(5/69)

UNITED STATES PATENT OFFICE
CERTIFICATE OF CORRECTION

Patent No. 3,847,878      Dated November 12, 1974

Inventor(s) Hanson, Robert B.; Stephens, James R.

It is certified that error appears in the above-identified patent and that said Letters Patent are hereby corrected as shown below:

Column 3, line 51 "1,4-diaminonaphthalene" should be 1,4'-diaminonaphthalene

Column 3, line 58 "4,4'-bis-o-tolylene" should be 4,4'-bi-o-tolylene

Column 3, line 59 - lines omitted "ene-di-o-tolyldiisocyanate, 4,methoxy-1,3-phenylene diisocyanate, 4-isopropyl-1,3-phenylene diisocyanate, Column 3, line 72 "usd" should be used Column 4, line 16 "whileat" should be while at Column 5, line 47 "the" should be that Column 5, line 49 "5 hour-20°C" should be 5-hour-220°C Column 5, line 62 "as" should be was Column 6, line 46 "as" should be was Column 7, line 4 - in the claims - [an excess of trimellitic anhydride moieties] should be omitted.

Signed and Sealed this sixth Day of January 1976

[SEAL]

Attest:

RUTH C. MASON
Attesting Officer

C. MARSHALL DANN
Commissioner of Patents and Trademarks